United States Patent [19]

Sato et al.

[11] Patent Number: 4,746,386
[45] Date of Patent: May 24, 1988

[54] METHOD OF PRODUCING CONTINUOUS FIBER REINFORCED BENT RESIN PIPE

[75] Inventors: Shigeru Sato, Sagamihara; Fumiko Sato, Kamakura; Toshihiro Ichijo, Sagamihara, all of Japan

[73] Assignee: Nitto Boseki Co., Ltd., Gonome Fukushima, Japan

[21] Appl. No.: 921,055

[22] Filed: Oct. 20, 1986

[30] Foreign Application Priority Data

Oct. 19, 1985 [JP] Japan ................. 60-232341

[51] Int. Cl.⁴ .................. B29C 53/60; B29C 53/82
[52] U.S. Cl. .................... 156/175; 156/196; 264/137; 264/219; 264/279; 264/279.1; 264/295; 264/313; 264/320; 264/325; 264/328.2; 264/339; 425/393
[58] Field of Search ............ 264/137, 257, 259, 271.1, 264/279, 279.1, 313, 324, 325, 339, 320, 328.2, 219, 295; 156/161, 175, 196, 245; 285/423, 919; 425/393, 403

[56] References Cited

U.S. PATENT DOCUMENTS

| 2,723,426 | 11/1955 | Pelley | 425/403 X |
| 2,878,038 | 3/1959 | Noland | 156/161 X |
| 3,633,943 | 1/1972 | Ramm et al. | 285/22 |
| 3,814,565 | 6/1974 | Cahour et al. | 425/393 X |
| 3,902,944 | 9/1975 | Ashton et al. | 156/175 X |
| 4,158,586 | 6/1979 | Usui | 264/137 X |
| 4,460,531 | 7/1984 | Harris et al. | 264/271.1 X |

FOREIGN PATENT DOCUMENTS

| 59-21769 | 5/1984 | Japan . |
| 60-155439 | 8/1985 | Japan . |
| 60-166439 | 8/1985 | Japan . |

Primary Examiner—Jeffery Thurlow
Assistant Examiner—Leo B. Tentoni
Attorney, Agent, or Firm—Henry Sternberg; Bert J. Lewen

[57] ABSTRACT

A method of producing a continuous fiber reinforced bent resin pipe, including winding a continuous reinforcing fiber on the outer surface of a tube-like flexible core mold while such core mold is straight in shape, the flexible core mold which is straight when unloaded being capable of keeping a cross section defined in radial direction when the core mold is bent. The core mold on which the continuous fiber has been wound is then bent and placed into a cavity defined by an outer mold formed of split molds each having an inner surface forming the predetermined outer configuration of a bent pipe. A liquefied synthetic resin is caused to be cured between the outer and the core molds to integrate both the fiber and resin. Thereafter the molded product is removed from the outer mold and the core mold is removed from the molded product.

11 Claims, 2 Drawing Sheets

F I G. 5
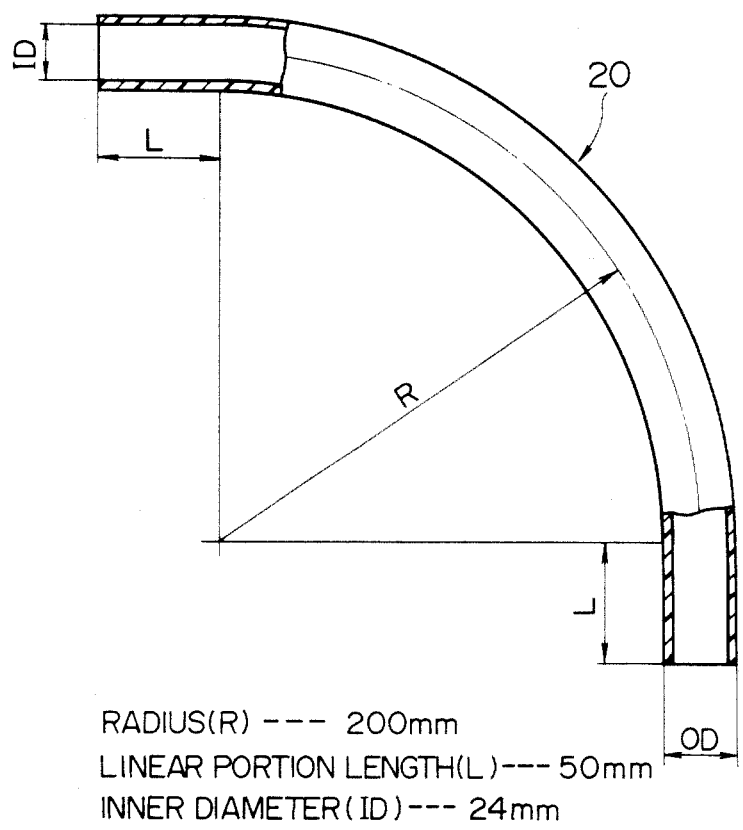
RADIUS(R) --- 200mm
LINEAR PORTION LENGTH(L) --- 50mm
INNER DIAMETER(ID) --- 24mm
OUTER DIAMETER(OD) --- 28mm

METHOD OF PRODUCING CONTINUOUS FIBER REINFORCED BENT RESIN PIPE

BACKGROUND OF THE INVENTION

The present invention relates to a method of producing a fiber reinforced bent resin pipe by an automatic molding method of filament winding.

Conventionally, a fiber reinforced bent resin pipe is manufactured by abutting half-split pipes of fiber reinforced resin and adhering them together, or by cutting a straight fiber reinforced resin pipe along a plane crossing the axis thereof into portions each having a trapezoidal shape when viewed as the top view thereof and abutting and adhering them together. In either method, hand lay-up forming is employed for adhering the pipes.

The workability of these conventional methods is therefore very poor. Further, the resultant reinforced resin pipe is inadequate in strength, and has a poor appearance.

In order to improve these problems, it has been proposed to initially manufacture a fiber reinforced straight resin pipe and then to bend it to a predetermined curvature as described in Japanese Examined Patent Publication No. 21769/1984. However, this method has disadvantages in that the resin employed is limited, in that strict control of the bending conditions is necessary, in that the bend radius is limited and pipes to have a curve of very small radius cannot be formed by bending, in that the pipe is apt to be flattened during the bending, and in that the resultant pipe is apt to retain residual stress and to be deformed during use.

It is also known to directly manufacture a bent pipe by the filament winding molding method. That is, a resin-impregnated reinforcing filament is wound on the circumference of a mandrel having a curved configuration, and, after the resin has cured, the mandrel is removed. In this method, since the mandrel is removed from a molded product formed on the circumference thereof, it must have such a structure that it can be disassembled into small parts. This makes the mandrel construction complicated and expensive. Moreover, the inner surface of the molded product is apt to have fins at a position corresponding to the seam of the mandrel parts. This method also necessitates a filament winding machine having a complicated structure for winding the continuous fiber on the curved mandrel at uniform winding angle.

SUMMARY OF THE INVENTION

In view of the above-described problems, it is a primary object of the present invention to provide a method of manufacturing a fiber reinforced bent resin pipe, which method is capable of producing a fiber reinforced bent resin pipe which is stronger and better in appearance than those produced by the conventional hand lay-up method, and which method can provide better workability than the known prior art method in which an assemblying-type mandrel is employed.

To this end, a method of manufacturing a fiber reinforced bent resin pipe is provided, which method comprises the steps of: winding a continuous reinforcing fiber on the circumference of a tube-like flexible core mold when said core mold is straight, said flexible core mold capable of keeping a cross section defined in the radial direction and being bendable while it is straight when unloaded; bending the core mold on which said continuous fiber is wound and placing the same in a cavity defined by assembled outer split molds each having an inner surface corresponding to the predetermined outer configuration of a bent pipe; causing a liquefied synthetic resin to be cured between said outer and core molds so as to integrate both the resin and said continuous fiber to form a molded product; and then removing said molded product from said outer mold and said core mold from said molded product.

As is described in the above, the flexible core mold on which a continuous fiber is to be wound has such stiffness in its radial direction, as being capable of keeping a cross section without substantial deformation and at the same time has such flexibility as being capable of bending. The core mold can therefore be bent or made straight, and a continuous fiber can be wound thereon while it is straight. As a result, a normal filament winding machine adapted to be used in molding a straight pipe can be employed for winding the fiber. Secondly, in the instant invention, the core mold on which the continuous fiber has been wound is bent and then placed in a cavity defined by an outer mold, and a liquefied synthetic resin is cured within the cavity of the outer mold to integrate both the resin and the continuous reinforcing fiber. Thus, in comparison with the conventional method wherein a fiber reinforced resin pipe is bent, the process of the invention can readily effect the bending operation and makes it possible to provide a small radius by the bending operation. This process of the invention also enables the thickness of the fiber reinforced resin layer to be made uniform, and no residual stress remains therein. Consequently, the resultant bent resin pipe may be produced with accurate dimensions and no deformation occurs which is apt to occur in the prior art due to residual stress. After the molding, the core mold must be removed, but, since it has flexibility, it can be removed easily.

BRIEF DESCRIPTION OF THE DRAWINGS

FIG. 5 is a partially sectional front view of a fiber reinforced bent resin pipe produced by the invention.

DESCRIPTION OF THE PREFERRED EMBODIMENT

An embodiment of the present invention will be described hereinbelow with reference to the accompanying drawings. In the embodiment a fiber reinforced bent resin pipe 20 shown in FIG. 5 was produced.

Figure 4:
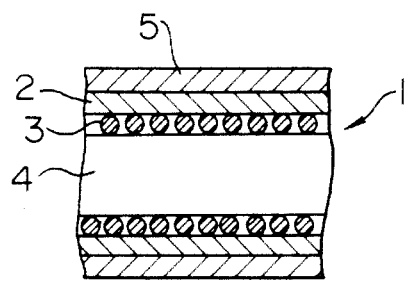
FIG. 4 is a cross-sectional view of a mandrel on which the core mold is mounted, around which core mold the reinforcing fiber layer is in turn provided.

Referring first to FIG. 4, a core mold 1 as employed in the present invention comprises a sleeve 2 having an outer diameter of 24 mm and a thickness of 3 mm, resulting in an inside diameter of 18 mm, which sleeve is formed of a flexible semi-rigid polyethylene, and a metallic coil tension spring 3 disposed inside the sleeve, which tension spring has an outer diameter of 17.8 mm and is made of a metal wire of 2 mm in diameter. The coil tension spring 3 is disposed in the sleeve loosely slidably, i.e. with 0.1 mm radial clearance between the 17.8 mm outside diameter spring 3 and the 18 mm inside diameter sleeve 2, so as to give both stiffness to the sleeve 2 in the radial direction and flexibility which makes the bending of the core mold possible. As a result, the core mold 1 is capable of being bent substantially in any direction without deformation of its radial cross section, although it is straight when unloaded. That is, when bent, the sleeve substantially maintains its cylindrical shape by virtue of the coil spring 3. A large number of metallic rings may be employed in place of the coil spring. Alternatively, the core mold may be constituted solely by the sleeve 2, if it has sufficient stiffness to keep the radial cross section without substantial deformation.

First, when the core mold 1 is straight, a roving of 2-3 mm in diameter made of continuous reinforcing fiber such as continuous glass fiber was wound on the circumference of the core mold by using a normal filament winding machine. More specifically, the core mold 1 was mounted on a straight metallic mandrel 4 of the filament winding machine, on the whole length of which core mold the roving of continuous fiber was then wound so as to form a reinforcing fiber layer 5, and the winding was repeated 4 to 5 times to provide a final fiber layer 5, having a thickness slightly smaller than the thickness of a bent resin pipe to be produced. Regarding the mounting of the core mold 1 onto the mandrel 4, the core mold having previously been assembled by disposing the sleeve 2 onto the coil tension spring 3 may be mounted on the mandrel 4. Alternatively, the coil spring 3 may be first mounted on the mandrel 4, on which the sleeve is then mounted. The roving of the continuous fiber to be wound may be impregnated with a suitable resin before the winding. Alternatively, the roving having no impregnated resin may be wound. Regarding the manner of winding, the continuous fiber may be wound on the mandrel by a parallel winding method, or a helical winding method.

Subsequently, the core mold 1, together with the reinforcing fiber layer 5 formed thereon, was taken off the metallic mandrel 4 of the filament winding machine. The core mold 1 and the fiber layer 5 formed thereon were then bent to give a predetermined radius of curvature, and were placed in an cavity of an outer mold 6 shown in FIG. 1. When bending the core mold 1, the tensile stress of the fiber wound on the core mold 1 is apt to change greatly depending on the fiber winding angle, i.e., particularly when the winding angle is small, the tensile stress occurring in the fiber changes in a large degree of magnitude. In such a case, the fiber cannot maintain its winding pattern. It is therefore preferable for both ends of the fiber layer 5 to be secured to the core mold 1 by means of a band or the like. If a resin impregnated fiber roving is employed to form the fiber layer 5 on the core mold 1, the core mold 1 and the fiber layer 5 must be bent before the impregnating resin is cured.

Figure 1:
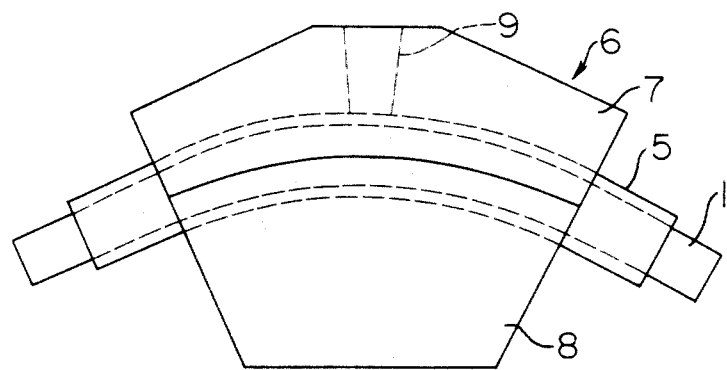
FIG. 1 is a front view of an outer mold, illustrating how it incorporates a core mold having a reinforcing fiber layer on the circumference thereof, which is one of the processes of the method of manufacturing a fiber reinforced bent resin pipe according to the present invention.
Figure 2:
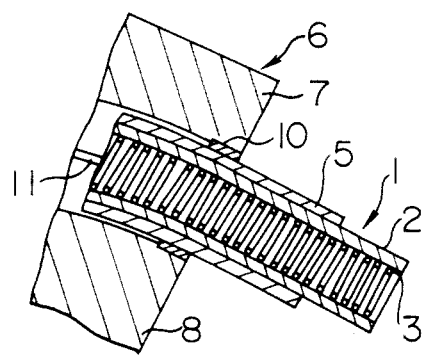
FIG. 2 is a cross-sectional view of part of FIG. 1.
Figure 3:
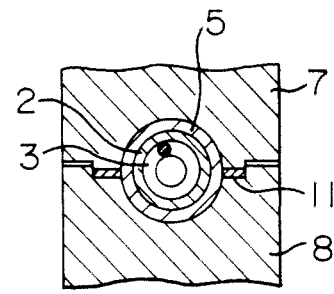
FIG. 3 is a cross-sectional view of the outer mold, showing the jointing portion of its upper and lower molds.

The outer mold 6, as shown in FIGS. 1 to 3, is a split mold which is separated into two pieces, i.e., an upper mold 7 and a lower mold 8, and has an inner surface which corresponds to the outer configuration of the bent tube to be produced. The upper mold 7 has a resin injection port 9 at its center. The outer mold 6 is provided with rubber-like elastic members 10 at both ends of its core mold mounting section, as shown in FIG. 2.

As shown in FIG. 3, the outer mold 6 is also provided with rubber-like elastic members 11 at a position where the upper and lower molds abut each other. The rubber-like elastic members 10, 11 are provided to prevent the resin forced into a cavity of the outer mold from flowing out of the mold.

Subsequently, liquefied resin was forced into the outer mold 6 through the resin injection port 9. Resin supplying pressure was suitably selected in accordance with the type of resin employed. However, in general it is set to have a pressure of 0.5 to 5 kgf/cm$^2$, preferably 1 to 3 kgf/cm$^2$. After the resin was forced into the mold, the resin was integrated with the reinforcing fiber layer 5 by the curing of the resin. After the curing of the resin, the outer mold 6 was separated, and the core mold 1 and the molded product formed thereon were removed from the outer mold 6. The core mold 1 was then taken off the molded product formed thereon, and both ends thereof were trimmed. Thus, a continuous fiber reinforced resin pipe bent to a predetermined radius of curvature was produced.

In this embodiment, the liquefied synthetic resin to be integrated with the continuous fiber was forced between the outer and core molds after the core mold 1 having been wound by the roving of the continuous fiber was disposed in the outer mold 6. Alternatively, the liquefied resin may also be supplied by impregnating the continuous fiber with a large amount thereof before the roving of continuous fiber is wound on the core mold 1 by the filament winding machine. In such case, the core mold 1, after having a resin-impregnated continuous fiber wound around it, may be bent before the liquefied synthetic resin is cured, and is mounted within the outer mold 6 so as to distribute the liquefied resin provided to the continuous fiber uniformly between the outer mold 6 and the core mold 1. The liquefied resin is then integrated with the reinforcing fiber layer 5 by the curing thereof so as to form a molded product, as in the first embodiment in which the liquefied resin was supplied between the outer and core molds.

The present invention may employ any resin capable of being forced into the mold and of being cured, or any resin capable of remaining uncured until the core mold on which the resin impregnated continuous fiber has been wound is disposed in the cavity of the bent outer mold, the fiber being impregnated with the resin before it is wound on the core mold. Such resins include polyester resin, epoxy resin and urethane resin. Continuous reinforcing fibers include glass fiber, carbon fiber and aramid fiber.

As will be clear from the foregoing description, a fiber reinforced bent resin pipe is manufactured in the present invention by the filament winding method in which continuous fiber is employed. As a result, the manufactured bent resin pipe is stronger than those manufactured by a conventional method such as hand lay-up process. The liquefied resin is molded into a predetermined shape between the outer and core molds. This enables the resultant product to be accurately dimensioned (including inner and outer diameters, radius of curvature, etc.). The product also has a smooth outer surface, and a good appearance. In addition, since the core mold has flexibility, the continuous reinforcing fiber can be wound around the circumference thereof by using a normal filament winding machine adapted to be used in molding a straight pipe. This makes fiber winding and removal of the molds from the molded product easier, thereby providing higher productivity.

What is claimed is:

1. A method of producing a continuous fiber reinforced bent resin pipe, comprising the steps of: winding a continuous reinforcing fiber on the outer surface of a tube-like flexible core mold while said core mold is straight in shape, said flexible core mold being capable of keeping a cross section defined in radial direction when the core mold is bent and being straight when unloaded; said core mold having a flexible sleeve of given inner diameter and a coil tension spring of given outer diameter slightly smaller than said inner diameter and loosely slidably inserted in the flexible sleeve with a slight radial clearance therebetween corresponding to the difference between said outer diameter and said inner diameter whereby said spring provides both stiffness to said sleeve in the radial direction and flexibility for permitting bending of the core mold substantially in any direction without deformation of its radial cross section; bending the core mold on which said continuous fiber has been wound and placing the same in a cavity defined by an outer mold comprising split molds each having an inner surface forming the predetermined outer configuration of a bent pipe; supplying a liquefied synthetic resin between said outer and core molds; curing the resin to integrate both the fiber and resin, and then removing the molded product from said outer mold and removing said core mold from said molded product.

2. A method of producing a continuous fiber reinforced bent resin pipe according to claim 1, wherein said liquefied synthetic resin is supplied by being forced between said outer and core molds after the core mold on which said continuous fiber is wound is disposed in said cavity defined by the outer mold.

3. A method of manufacturing continuous fiber reinforced bent resin pipe according to claim 1, wherein said liquefied synthetic resin is supplied by being previously impregnated in said continuous fiber before said continuous fiber is wound on said core mold.

4. A method of producing a continuous fiber reinforced bent resin pipe according to claim 1, wherein the flexible sleeve is made of a semirigid polyethylene.

5. A method of producing a continuous fiber reinforced bent resin pipe according to claim 1, wherein the fiber is of a roving having a diameter of 2 to 3 mm, the thickness of the wound fiber being a value slightly smaller than the thickness of the resultant bent pipe.

6. A method of producing a continuous fiber reinforced bent resin pipe according to claim 1, wherein the winding is effected by parallel winding or helical winding.

7. A method of producing a continuous fiber reinforced bent resin pipe according to claim 1, further comprising the step of fixing both ends of the fiber wound on the core mold by use of bands.

8. A method of producing a continuous fiber reinforced bent resin pipe according to claim 1, wherein said resin is supplied with a feeding pressure of 0.5 to 5 Kgf/cm$^2$.

9. A method of producing a continuous fiber reinforced bent resin pipe according to claim 1, wherein the resin is selected from the group consisting of polyester resin, epoxy resin and urethane resin.

10. A method of producing a continuous fiber reinforced bent resin pipe according to claim 1, wherein the reinforcing fiber is selected from the group consisting of glass fiber, carbon fiber and aramid fiber.

11. A method of producing a continuous fiber reinforced bent resin pipe, comprising the steps of:
    forming a tube-like flexible core mold by first forming a flexible sleeve having a given inner diameter and then inserting into the interior of said sleeve a coil tension spring having an outer diameter slightly smaller than said given inner diameter so that said tension spring will be loosely slidably received within said sleeve; inserting an elongated straight mandrel axially into the space formed by said coil tension spring; winding a continuous reinforcing fiber on the outer surface of said flexible sleeve of the core mold while said core mold is supported on the mandrel; removing said flexible core mold with said reinforcing fiber wound therearound from the mandrel; bending the core mold on which said continuous fiber has been wound, said flexible core mold being capable of maintaining a cross-section defined in radial direction when the core mold is bent; placing the bent core mold with the continuous reinforcing fiber wound therearound, in a cavity defined by an outer mold comprising split molds having inner surfaces for forming the desired predetermined outer configuration of a bent pipe; providing a liquefied synthetic resin between said outer and core molds; curing the resin to integrate both the fiber and resin; and then removing the molded product from the outer mold and removing the core mold from the molded product.

* * * * *